(12) United States Patent
Jun et al.

(10) Patent No.: US 11,460,954 B2
(45) Date of Patent: Oct. 4, 2022

(54) TOUCH SENSOR PANEL DRIVING METHOD AND TOUCH INPUT DEVICE

(71) Applicant: HiDeep Inc., Seongnam-si (KR)

(72) Inventors: Jae Bum Jun, Seongnam-si (KR); Young Ho Cho, Seongnam-si (KR)

(73) Assignee: HIDEEP INC., Gyeonggi-Do (KR)

( * ) Notice: Subject to any disclaimer, the term of this patent is extended or adjusted under 35 U.S.C. 154(b) by 0 days.

(21) Appl. No.: 17/270,937

(22) PCT Filed: Sep. 5, 2019

(86) PCT No.: PCT/KR2019/011434
§ 371 (c)(1),
(2) Date: Feb. 24, 2021

(87) PCT Pub. No.: WO2020/050634
PCT Pub. Date: Mar. 12, 2020

(65) Prior Publication Data
US 2021/0326024 A1   Oct. 21, 2021

(30) Foreign Application Priority Data

Sep. 6, 2018  (KR) .................. 10-2018-0106321
Sep. 14, 2018 (KR) .................. 10-2018-0110006

(51) Int. Cl.
G06F 3/041  (2006.01)

(52) U.S. Cl.
CPC .............................. G06F 3/04184 (2019.05)

(58) Field of Classification Search
CPC ............. G06F 3/04184; G06F 3/04182; G06F 2203/04111; G09G 5/003
See application file for complete search history.

(56) References Cited

U.S. PATENT DOCUMENTS

| | | | | |
|---|---|---|---|---|
| 11,079,878 B1* | 8/2021 | Krah | ........................ | H03H 7/06 |
| 2013/0057512 A1* | 3/2013 | Lillie | ..................... | G06F 3/0412 345/174 |
| 2013/0069894 A1* | 3/2013 | Chen | ..................... | G06F 3/0445 345/173 |
| 2013/0106779 A1* | 5/2013 | Company Bosch | .... | G06F 3/044 345/174 |
| 2013/0194229 A1* | 8/2013 | Sabo | ..................... | G06F 3/0412 345/174 |
| 2014/0049507 A1* | 2/2014 | Shepelev | ............ | G06F 3/04184 345/174 |

(Continued)

FOREIGN PATENT DOCUMENTS

| | | |
|---|---|---|
| JP | 2014132415 | 7/2014 |
| KR | 20130033562 | 4/2013 |

(Continued)

*Primary Examiner* — Ibrahim A Khan
(74) *Attorney, Agent, or Firm* — The Belles Group, P.C.

(57) ABSTRACT

A touch sensor panel driving method of applying a touch driving signal to a touch sensor panel according to a display synchronization signal according to an embodiment of the present invention includes synchronizing the touch driving signal applied to the touch sensor panel with the display synchronization signal and applying the touch driving signal, in which the touch driving signal includes a first touch driving signal and a second touch driving signal having a 180°-inverted phase to the first touch driving signal.

13 Claims, 12 Drawing Sheets

(56) References Cited

U.S. PATENT DOCUMENTS

| | | | | |
|---|---|---|---|---|
| 2014/0132560 A1* | 5/2014 | Huang | ................... | G06F 3/041 |
| | | | | 345/174 |
| 2014/0152616 A1* | 6/2014 | Kida | ....................... | G06F 3/0446 |
| | | | | 345/174 |
| 2014/0176496 A1* | 6/2014 | Azumi | ................ | G06F 3/04182 |
| | | | | 345/174 |
| 2014/0320450 A1* | 10/2014 | Lee | .................... | G06F 3/04182 |
| | | | | 345/174 |
| 2015/0022489 A1* | 1/2015 | Gossner | ............. | G06F 3/04182 |
| | | | | 345/174 |
| 2015/0205433 A1* | 7/2015 | Mizuhashi | .......... | G06F 3/04184 |
| | | | | 345/174 |
| 2015/0261356 A1* | 9/2015 | Shepelev | ............... | G06F 3/0446 |
| | | | | 345/174 |
| 2016/0299618 A1* | 10/2016 | Liu | ........................ | G06F 3/044 |
| 2017/0003804 A1* | 1/2017 | Sung | ................... | G02F 1/13338 |
| 2017/0139501 A1* | 5/2017 | Dinu | ................... | G06F 3/04166 |
| 2018/0217713 A1* | 8/2018 | Bye | ....................... | G06F 3/0446 |

FOREIGN PATENT DOCUMENTS

| KR | 20130109691 | 10/2013 |
|---|---|---|
| KR | 20150034046 | 4/2015 |
| KR | 20160032768 | 3/2016 |

\* cited by examiner

TOUCH SENSOR PANEL DRIVING METHOD AND TOUCH INPUT DEVICE

CROSS-REFERENCE TO RELATED PATENT APPLICATIONS

The present application is a U.S. national stage application under 35 U.S.C. § 371 of PCT Application No. PCT/KR2019/011434, filed Sep. 5, 2019, which claims priority to Korean Patent Application No. 10-2018-0110006, filed Sep. 14, 2018 and Korean Patent Application No. 10-2018-0106321, filed Sep. 6, 2018. The disclosures of the aforementioned priority applications are incorporated herein by reference in their entireties.

TECHNICAL FIELD

The present invention relates to a touch sensor panel driving method and a touch input apparatus, and more particularly, to a touch sensor panel driving method and a touch input apparatus, which apply a touch driving signal having a changed phase to a touch sensor panel in order to reduce display noise.

BACKGROUND ART

Various kinds of input devices are being used to operate a computing system. For example, input devices such as a button, a key, a joystick and a touch screen are used. Since the touch screen is easy and simple to operate, the touch screen is increasingly being used to operate the computing system.

The touch screen may include a touch sensor panel which may be a transparent panel including a touch-sensitive surface. The touch sensor panel is attached to a front side of a display screen, and then the touch-sensitive surface may cover a visible side of the display screen. The touch screen allows a user to operate the computing system by simply touching the display screen by a finger, etc. In general, the touch screen computing system recognizes the touch and a position of the touch on the display screen and the computing system analyzes the touch to perform operations in accordance with the analysis.

In general, a driving signal having a specific frequency is input to each row wiring, and then a signal of a corresponding frequency is sensed through each column wiring to identify the presence or absence of a touch and a location thereof. However, if noise exists in a corresponding frequency band for various reasons, the precision of touch sensing is degraded. Accordingly, the frequency of the driving signal, i.e., the frequency used for the touch sensing needs to be changed.

DISCLOSURE

Technical Problem

The present invention is contrived in accordance with the above-described necessity and the present invention has been made in an effort to minimize an influence by noise in a frequency of a driving signal when the noise exists in a frequency band of the driving signal in touch sensing.

The present invention has also been made in an effort to provide a method for escaping from the corresponding noise through frequency hopping through a dummy scan.

Technical Solution

A touch sensor panel driving method of applying a touch driving signal to a touch sensor panel according to a display synchronization signal according to an embodiment of the present invention includes synchronizing the touch driving signal applied to the touch sensor panel with the display synchronization signal and applying the touch driving signal, in which the touch driving signal includes a first touch driving signal and a second touch driving signal having a 180°-inverted phase to the first touch driving signal.

According to an embodiment, the touch driving signal may have a frequency of 1/n times or n times of the frequency of the display synchronization signal.

According to an embodiment, the first touch driving signal and the second touch driving signal may be alternately applied at a predetermined period.

According to an embodiment, an Analogue Digital Converter (ADC) output value may be obtained at least once in a period in which the first touch driving signal and the second touch driving signal are high and a period in which the first touch driving signal and the second touch driving signal are low, respectively.

According to an embodiment, the sampling coefficient may be +1 in a period in which the first touch driving signal and the second touch driving signal are high and be −1 in a period in which the first touch driving signal and the second touch driving signal are low.

According to an embodiment, the predetermined period may be N times (N is a natural number of 1 or more) of the period in which the first touch driving signal and the second touch driving signal are repeated once.

According to an embodiment, the touch driving signal may be driven with an effective frequency constituted by a driving frequency ($f_{tx}$) and a phase inversion frequency ($f_{mod}$) for changing a phase of the driving frequency, and a dummy scan of scanning a noise level based on the effective frequency may be performed to perform frequency hopping according to a result of the performed dummy scan.

According to an embodiment, the effective frequency may satisfy a following equation for the driving frequency ($f_{tx}$) and the phase inversion frequency ($f_{mod}$), effective frequency=driving frequency ($f_{tx}$)±phase inversion frequency ($f_{mod}$), and the performing of the frequency hopping may include a first step of performing a first dummy scan with a current effective frequency, a second step of performing a second dummy scan with a new effective frequency when a noise value acquired by performing the first dummy scan is equal to or more than the first threshold, and a third step of performing the frequency hopping with the new effective frequency when a noise value acquired by performing the second dummy scan with the new effective frequency is equal to or less than a second threshold.

According to an embodiment, in the first step, the first dummy scan may be performed by phase-inverting the driving frequency ($f_{tx}$) for each phase inversion frequency ($f_{mod}$).

According to an embodiment, in the first step, the first dummy scan may be performed based on a frequency corresponding to the current effective frequency value.

According to an embodiment, in the second step, the second dummy scan may be performed by phase-inverting a new driving frequency for each phase inversion frequency ($f_{mod}$).

According to an embodiment, in the second step, the second dummy scan may be performed by phase-inverting the driving frequency ($f_{tx}$) for each new phase inversion frequency.

According to an embodiment, in the second step, the second dummy scan may be performed based on a frequency corresponding to the new effective frequency value.

A touch input apparatus according to another embodiment of the present invention includes: a touch sensor panel; and a control unit controlling, when a touch driving signal is applied to the touch sensor panel according to a display synchronization signal, to apply the touch driving signal in synchronization with the display synchronization signal, in which the touch driving signal includes a first touch driving signal and a second touch driving signal having a 180°-inverted phase to the first touch driving signal.

Advantageous Effects

According to an embodiment of the present invention, when noise exists in a frequency band of a driving signal in touch sensing, the noise can be minimized in a frequency of the driving signal.

MODE FOR INVENTION

Figure 1A:
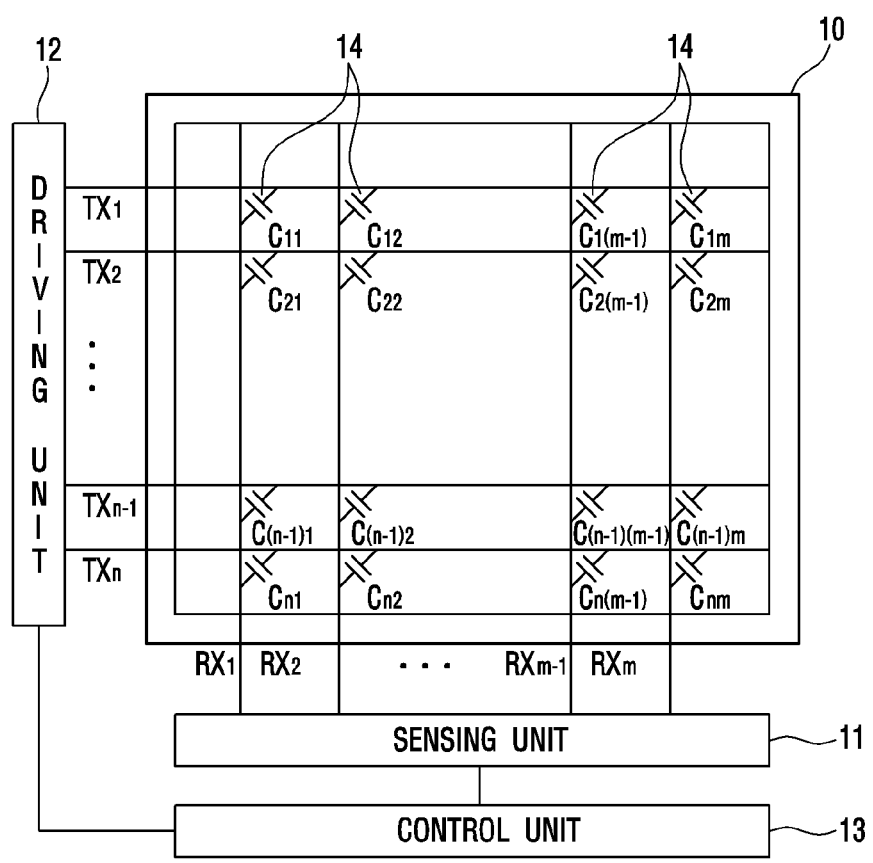
FIGS. 1A and 1B is a schematic view of a capacitive touch sensor panel 10 included in a touch input apparatus 1000 and a configuration for an operation thereof according to an embodiment of the present invention.

The following detailed description of the present invention will be made with reference to the accompanying drawings which illustrate a specified embodiment in which the present invention may be implemented as an example. The embodiment will be described in enough detail so that those skilled in the art are able to embody the present invention. It should be understood that various embodiments of the present invention are different from each other and need not be mutually exclusive. For example, specific shapes, structures, and characteristics described herein may be implemented in other embodiments without departing from the spirit and scope of the present invention in relation to one embodiment. In addition, it is to be understood that the location or arrangement of individual components within each disclosed embodiment may be changed without departing from the spirit and scope of the present invention. Accordingly, the detailed description to be described below is not intended to be taken in a limiting sense, and the scope of the present invention, if properly described, is limited only by the appended claims, along with all scopes equivalent to those claimed by the claims. Similar reference numerals in the drawings designate the same or similar functions in many aspects.

Hereinafter, a touch sensor panel driving method according to an embodiment of the present invention will be introduced with reference to the accompanying drawings. Hereinafter, a capacitive touch input apparatus 1000 is exemplified, but the present invention may be applied even to a method for driving a touch input apparatus 1000 capable of detecting a touch position in a predetermined method in the same/similar manner.

FIG. 1A is a schematic view of a capacitive touch sensor panel 10 included in a touch input apparatus 1000 and a configuration for an operation thereof according to an embodiment of the present invention. Referring to FIG. 1A, the touch sensor panel 10 may include a plurality of driving electrodes TX1 to TXn and a plurality of receiving electrodes RX1 to RXm, and may include a driving unit 12 which applies a driving signal to the plurality of driving electrodes TX1 to TXn for the purpose of the operation of the touch sensor panel 10, and a sensing unit 11 which detects a touch and/or a touch position by receiving a sensing signal including information on a capacitance change amount changing according to the touch on a touch surface from the plurality of receiving electrodes RX1 to RXm.

As illustrated in FIG. 1A, the touch sensor panel 10 may include the plurality of driving electrodes TX1 to TXn and the plurality of receiving electrodes RX1 to RXm. While FIG. 1A illustrates that the plurality of driving electrodes TX1 to TXn and the plurality of receiving electrodes RX1 to RXm of the touch sensor panel 10 form an orthogonal array, the present invention is not limited thereto and the plurality of driving electrodes TX1 to TXn and the plurality of receiving electrodes RX1 to RXm may have arbitrary numbers of dimensions including a diagonal array, a concentric array, a 3-dimensional random array, etc., and an application array thereof. Here, "n" and "m" which are positive integers may be the same as each other or may be different from each other and magnitudes of the values may be changed depending on the embodiment.

The plurality of driving electrodes TX1 to TXn and the plurality of receiving electrodes RX1 to RXm may be arranged to cross each other. The driving electrode TX may include the plurality of driving electrodes TX1 to TXn extending in a first axial direction and the receiving electrode RX may include the plurality of receiving electrodes RX1 to RXm extending in a second axial direction crossing the first axial direction.

Figure 4A:
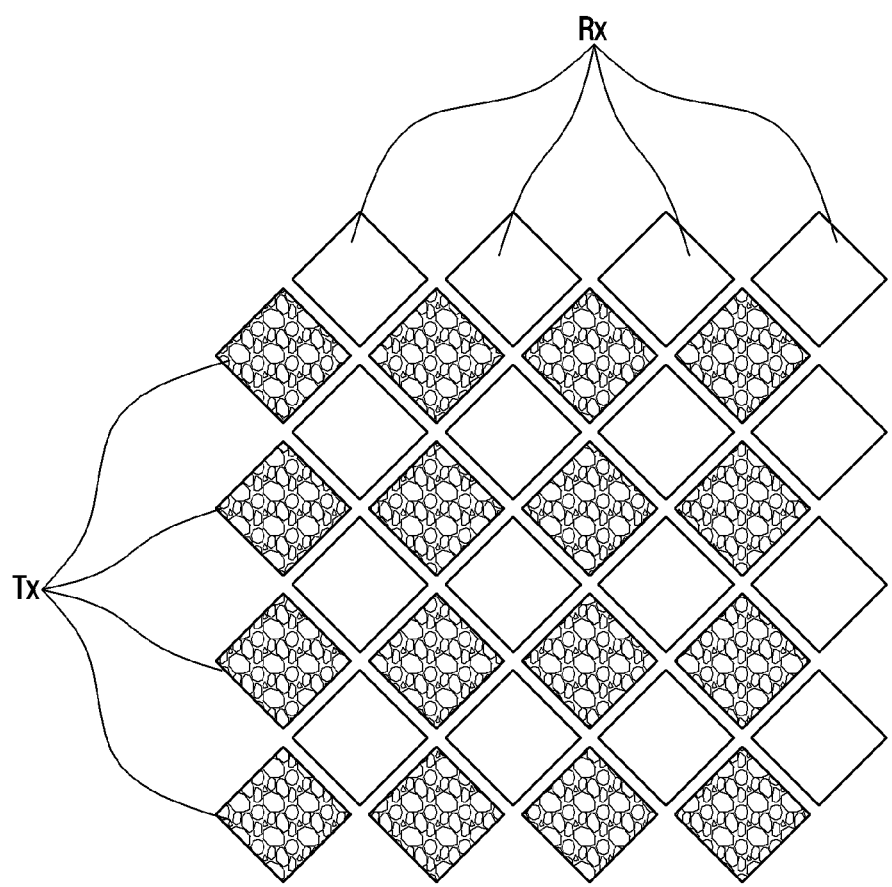
FIGS. 4A to 4D is a diagram referred to describe an arrangement example of a plurality of driving electrodes and a plurality of receiving electrodes in a touch sensor panel 10 according to an embodiment of the present invention.
Figure 4B:
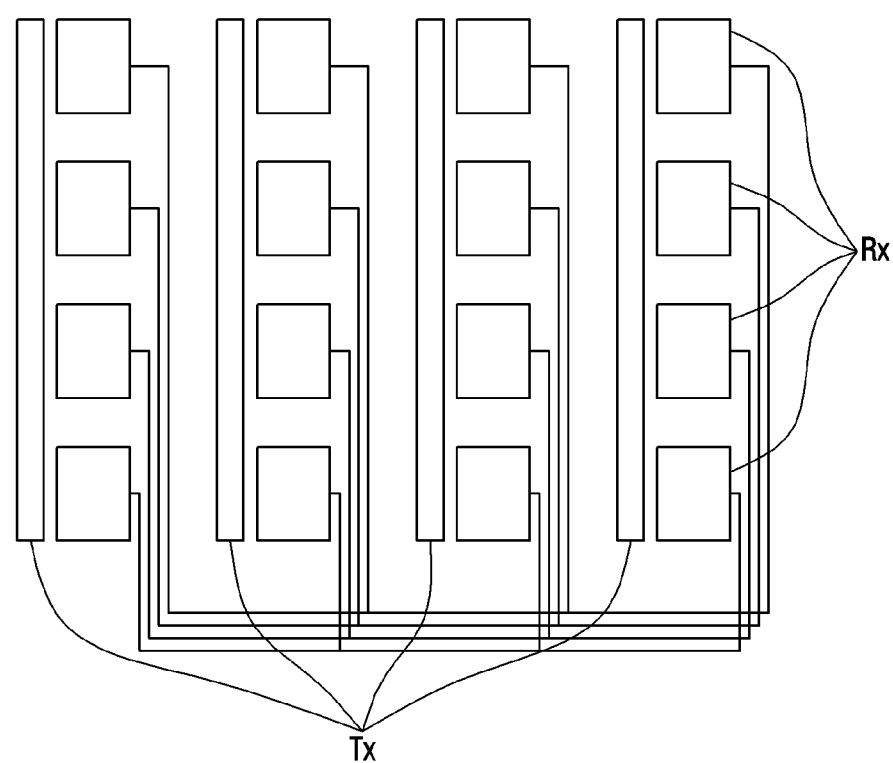

As illustrated in FIGS. 4A and 4B, in the touch sensor panel 10 according to the embodiment of the present invention, the plurality of driving electrodes TX1 to TXn and the plurality of receiving electrodes RX1 to RXm may be formed in the same layer. For example, the plurality of driving electrodes TX1 to TXn and the plurality of receiving electrodes RX1 to RXm may be formed on the top of the display panel 200A to be described below.

Figure 4C:
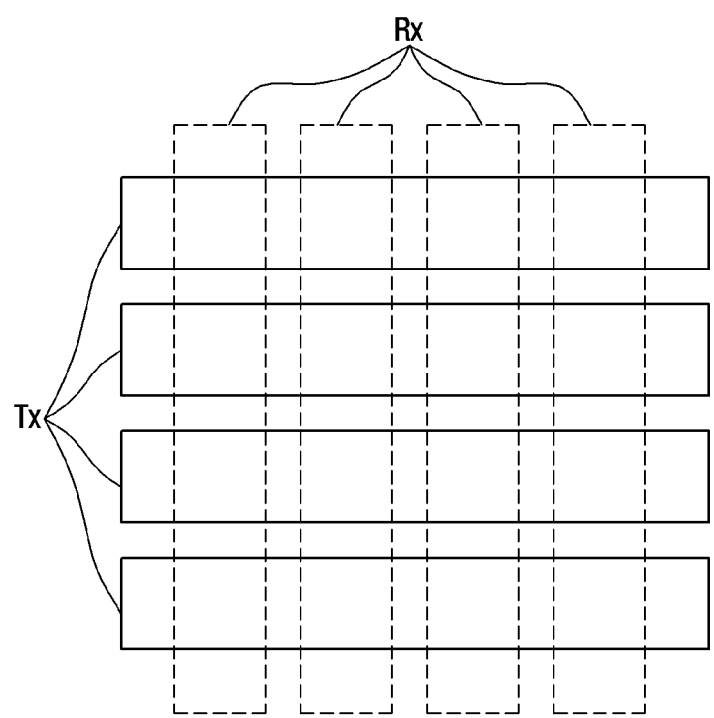

Further, as illustrated in FIG. 4C, the plurality of driving electrodes TX1 to TXn and the plurality of receiving electrodes RX1 to RXm may be formed on different layers. For example, one of the plurality of driving electrodes TX1 to TXn and the plurality of receiving electrodes RX1 to RXm may be formed on an upper surface of the display panel 200A, and the other one may be formed on a lower surface of a cover to be described later or in the display panel 200A.

The plurality of driving electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example and the driving electrode TX and the receiving electrode RX may also be made of another transparent conductive material or an opaque conductive material. For instance, the driving electrode TX and the receiving electrode RX may be formed to include at least any one of silver ink, copper, nano silver or carbon nanotube (CNT). Further, the driving electrode TX and the receiving electrode RX may be implemented by a metal mesh.

The driving unit 12 according to an embodiment of the present invention may apply a driving signal to the driving electrodes TX1 to TXn. In an embodiment of the present invention, one driving signal may be sequentially applied to one driving electrode at a time from the first driving electrode TX1 to the n-th driving electrode TXn. The driving signal may be applied again repeatedly. This is only an example and the driving signals may be applied to the plurality of driving electrodes at the same time in accordance with the embodiment.

Through the receiving electrodes RX1 to RXm, the sensing unit 11 receives the sensing signal including information on a capacitance (Cm) 14 generated between the receiving electrodes RX1 to RXm and the driving electrodes TX1 to TXn to which the driving signal has been applied, thereby detecting whether the touch has occurred and where the touch has occurred. For example, the sensing signal may be a signal obtained by coupling the driving signal applied to the driving electrode TX by the capacitance (CM) 14 generated between the driving electrode TX and the receiving electrode RX. As such, the process of sensing the driving signal applied from the first driving electrode TX1 to the n-th driving electrode TXn through the receiving electrodes RX1 to RXm may be referred to as a process of scanning the touch sensor panel 10.

For example, the sensing unit 11 may include a receiver (not illustrated) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. In this case, the positive (+) input terminal of the amplifier may be connected to the ground. Further, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 14, and then converts the integrated current signal into voltage. The sensing unit 11 may further include an analog-to-digital converter (ADC) (not shown) which converts the integrated data by the receiver into digital data. Later, the digital data may be input to a processor (not illustrated) and processed to obtain information on the touch on the touch sensor panel 10. The sensing unit 11 may include the ADC and the processor as well as the receiver.

The control unit 13 may perform a function of controlling the operations of the driving unit 12 and the sensing unit 11. For example, the control unit 13 generates and transmits a driving control signal to the driving unit 12, so that the driving signal may be applied to a predetermined driving electrode TX1 at a predetermined time. Further, the control unit 13 generates and transmits the driving control signal to the sensing unit 11, so that the sensing unit 11 may receive the sensing signal from the predetermined receiving electrode RX at a predetermined time and perform a predetermined function.

In FIG. 1A, the driving unit 12 and the sensing unit 11 may constitute a touch detection device (not illustrated) capable of detecting whether the touch has occurred on the touch sensor panel 10 and/or where the touch has occurred. The touch detection device may further include the control unit 13. The touch detection device may be implemented by being integrated on a touch sensing integrated circuit (IC) corresponding to a touch sensor controller 1100 to be described below in the touch input apparatus 1000 including the touch sensor panel 10. The driving electrode TX and the receiving electrode RX included in the touch sensor panel 10 may be connected to the driving unit 12 and the sensing unit 11 included in the touch sensing IC through, for example, a conductive trace and/or a conductive pattern printed on a circuit board, or the like. The touch sensing IC may be located on a circuit board on which the conductive pattern is printed, e.g., a touch circuit board (hereinafter, referred to as a touch PCB). According to an embodiment, the touch sensing IC may be mounted on a main board for operation of the touch input device 1000.

As described above, a capacitance (Cm) with a predetermined value is generated at each crossing point of the driving electrode TX and the receiving electrode RX and when an object like a finger approaches the touch sensor panel 10, the value of the capacitance may be changed. In FIG. 1A, the capacitance may represent a mutual capacitance (Cm). The sensing unit 11 senses such electrical characteristics to sense whether the touch on the touch sensor panel 10 is made and/or a touch position. For example, the sensing unit 110 is able to sense whether the touch is made on the surface of the touch sensor panel 10 comprised of a two-dimensional plane consisting of a first axis and a second axis and/or the position thereof.

More specifically, when the touch occurs on the touch sensor panel 10, the driving electrode TX to which the driving signal has been applied is detected, so that the position of the second axial direction of the touch may be detected. Likewise, when the touch occurs on the touch sensor panel 10, the capacitance change is detected from the reception signal received through the receiving electrode RX, so that the position of the first axial direction of the touch can be detected.

Hereinabove, the operation scheme of the touch sensor panel 10 sensing the touch position is described based on the mutual capacitance change amount between the driving electrode TX and the receiving electrode RX, but the present invention is not limited thereto. That is, as illustrated in FIG. 1B, it is also possible to sense the touch position based on a self capacitance change amount.

Figure 1B:
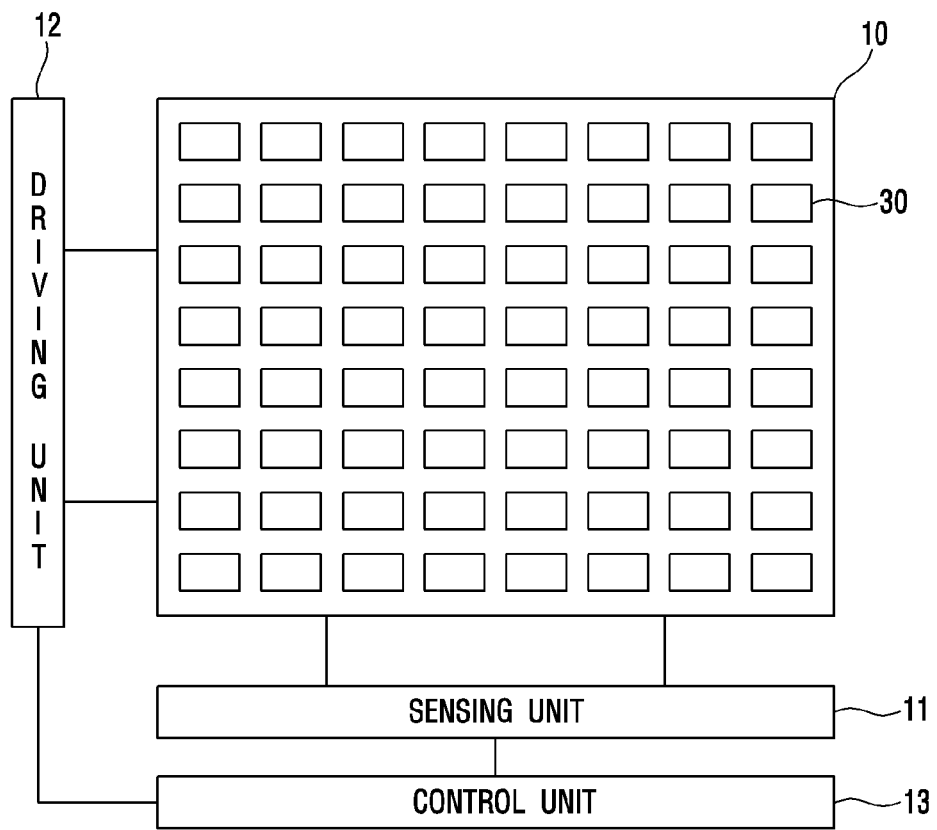
Figure 4D:
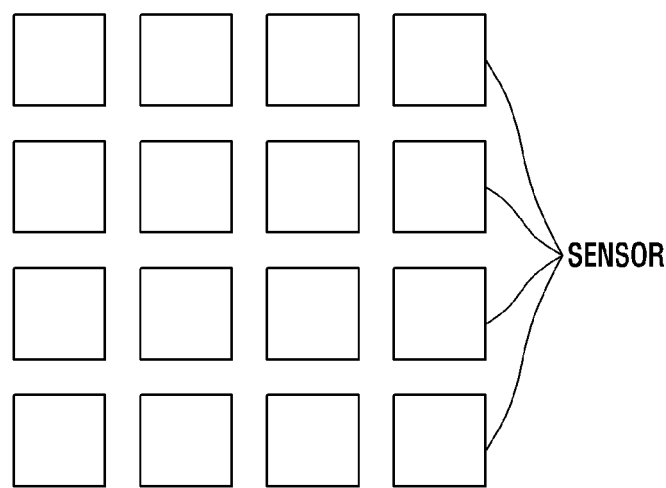

FIG. 1B is a schematic view for describing another capacitive touch sensor panel 10 included in a touch input apparatus 1000 and an operation thereof according to another embodiment of the present invention. The touch sensor panel 10 illustrated in FIG. 1B includes a plurality of touch electrodes 30. The plurality of touch electrodes 30 may be arranged in a grid shape at a regular interval as illustrated in FIG. 4D, but is not limited thereto.

The driving control signal generated by the control unit 13 is transferred to the driving unit 12, and the driving unit 12 applies the driving signal to a preset touch electrode 30 at a predetermined time based on the driving control signal. Further, the sensing control signal generated by the control unit 13 is transferred to the sensing unit 11, and the sensing unit 11 receives the sensing signal from a preset touch electrode 30 at a predetermined time based on the sensing control signal. In this case, the sensing signal may be a signal for the self capacitance change amount formed on the touch electrode 30.

In this case, whether the touch sensor panel 10 is touched and/or the touch position is detected by the sensing signal sensed by the sensing unit 11. For example, since the coordinates of the touch electrode 30 are known in advance, whether an object touches the surface of the touch sensor panel 10 and/or a position thereof may be detected.

Hereinabove, for convenience of description, the driving unit 12 and the sensing unit 11 have been described as being divided into separate blocks to operate, but an operation of applying the driving signal to the touch electrode 30 and receiving the sensing signal from the touch electrode 30 may also be performed by one driving and sensing unit.

The capacitive touch sensor panel as the touch sensor panel 10 has been described in detail in the foregoing, but in the touch input apparatus 1000 according to an embodiment of the present invention, the touch sensor panel 10 for detecting whether or not the touch has occurred and where the touch has occurred may be implemented by using not only the above-described method but also any touch sensing method such as a surface capacitance type method, a projected capacitance type method, a resistance film method, a surface acoustic wave (SAW) method, an infrared method, an optical imaging method, a dispersive signal technology, and an acoustic pulse recognition method, etc.

Figure 2:
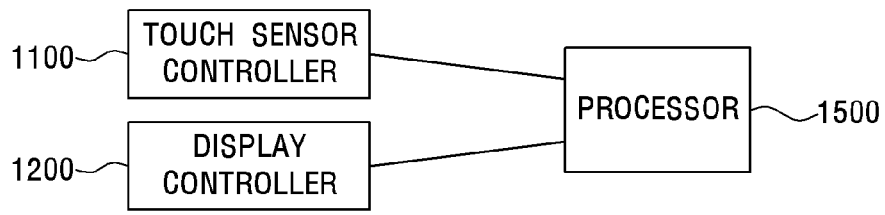
FIG. 2 is a diagram illustrating a control block for controlling touch position detection and a display operation in a touch input apparatus 1000 according to an embodiment of the present invention.

FIG. 2 is a diagram illustrating a control block for controlling touch position detection and a display operation in a touch input apparatus 1000 according to an embodiment of the present invention. In the touch input apparatus 1000, the control block may be configured to include a touch sensor controller 1100 for detecting the touch position and a display controller 1200 for driving the display panel. In this case, the display controller 1200 may include a control circuit which receives an input from an application processor (AP) or a central processing unit (CPU) on a main board for the operation of the touch input device 1000 and displays the contents that the user wants on the display panel 200A. Such a control circuit may be mounted on a display circuit board (hereinafter, referred to as a display PCB). In this case, the control circuit for the operation of the display panel 200A may include a display panel control IC, a graphic controller IC, and other circuits required to operate the display panel 200A.

According to an embodiment, the touch sensor controller 1100 and the display controller 1200 as different components may be included in the touch input apparatus 1000. For example, the touch sensor controller 1100 and the display controller 1200 may be constituted by different chips. In this case, the processor 1500 of the touch input apparatus 1000 may serve as a host processor for the touch sensor controller 1100 and the display controller 1200.

The touch input apparatus 1000 according to an embodiment of the present invention may include an electronic device including the display screen and/or the touch screen, for example, a cell phone, a personal data assistant (PDA), a smart phone, a tablet personal computer (PC), an MP3 player, a laptop computer, etc.

In order to manufacture such a touch input device 1000 to be a slim and have a light weight, as described above, the touch sensor controller 1100 and the display controller 1200 configured separately may be integrated into one or more components according to an embodiment. In addition, the respective controllers may be integrated into the processor 1500. Moreover, according to an embodiment, the touch sensor panel 10 may be integrated into the display panel 200A.

In the touch input apparatus 1000 according to an embodiment, the touch sensor panel 10 for detecting the touch position may be located outside or inside the display panel 200A. The display panel 200A of the touch input device 1000 according to an embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel.

Figure 3A:
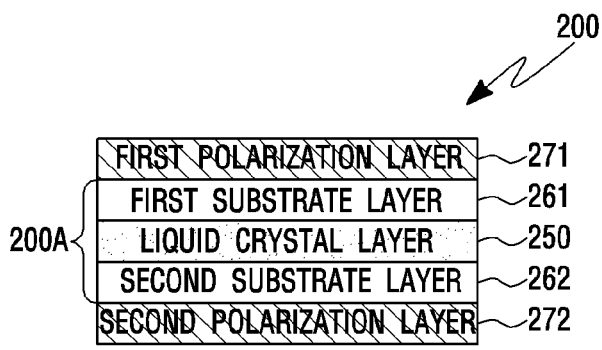
FIGS. 3A and 3B are conceptual views for describing a configuration of a display module 200 in a touch input apparatus 1000 according to the present invention.
Figure 3B:
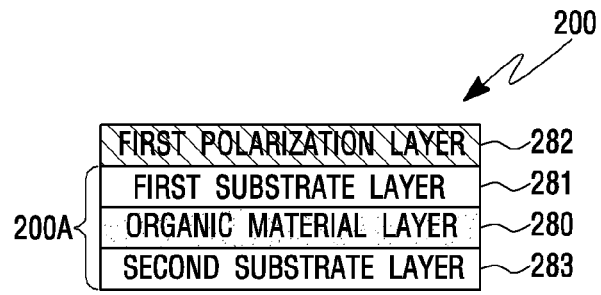

FIGS. 3A and 3B are conceptual views for describing a configuration a display module 200 in a touch input apparatus 1000 according to the present invention. First, referring to FIG. 3A, the configuration of the display module 200 including the display panel 200A using an LCD panel will be described.

As illustrated in FIG. 3A, the display module 200 may include the display panel 200A which is the LCD panel, and a first polarization layer 271 arranged above the display panel 200A and a second polarization layer 272 arranged below the display panel 200A. Further, the display panel 200A which is the LCD panel may include a liquid crystal layer 250 including liquid crystal cells, and a first substrate layer 261 arranged above the liquid crystal layer 250 and a second substrate layer 262 arranged below the liquid crystal layer 250. In this case, the first substrate layer 261 may be color filter glass, and the second substrate layer 262 may be TFT glass. Further, according to an embodiment, at least one of the first substrate layer 261 and the second substrate layer 262 may be made of a material capable of bending such as plastic. In FIG. 3A, the second substrate layer 262 may be constituted by various layers including a data line, a gate line, TFT, a common electrode Vcom, and a pixel electrode. The electrical components may operate in such a manner as to generate a controlled electric field and orient liquid crystals located in the liquid crystal layer 250.

Next, referring to FIG. 3B, the configuration of the display module 200 including the display panel 200A using an OLED panel will be described.

As illustrated in FIG. 3B, the display module 200 may include the display panel 200A which is the OLED panel and a first polarization layer 282 arranged above the display panel 200A. In addition, the display panel 200A which is the OLED panel may include an organic material layer 280 including an Organic Light-Emitting Diode (OLED), and a first substrate layer 281 arranged above the organic material layer 280 a second substrate layer 283 arranged below the organic material layer 280. In this case, the first substrate layer 281 may be encapsulation glass and the second substrate layer 283 may be the TFT glass. Further, according to an embodiment, at least one of the first substrate layer 281 and the second substrate layer 283 may be made of a material capable of bending such as plastic. The OLED panel may include electrodes used to drive the display panel 200A, such as a gate line, a data line, a first power line ELVDD, and a second power line ELVSS. The Organic Light-Emitting Diode (OLED) panel is a self-light emitting display panel which uses a principle where, when current flows through a fluorescent or phosphorescent organic thin film, electrons and holes are combined in the organic material layer, so that light is generated, and the organic matter constituting the light emitting layer determines the color of the light.

Specifically, the OLED uses a principle in which when an organic matter is applied on glass or plastic and electricity flows thereon, the organic matter emits light. That is, the principle is used in which holes and electrons are injected into the anode and cathode of the organic matter respectively and are recombined in the light emitting layer, so that a high energy exciton is generated and the exciton releases the energy while falling down to a low energy state and then light with a particular wavelength is generated. In this case, the color of the light is changed according to the organic matter of the light emitting layer.

The OLED includes a line-driven passive-matrix organic light-emitting diode (PM-OLED) and an individual driven active-matrix organic light-emitting diode (AM-OLED) in accordance with the operating characteristics of a pixel constituting a pixel matrix. Since none of them require a backlight, the OLED enables a very thin display module to be implemented, has a constant contrast ratio according to an angle and obtains a good color reproducibility depending on a temperature. Further, the OLEDs are very economical in that a non-driven pixel does not consume power.

In terms of operation, the PM-OLED emits light only during a scanning time at a high current, and the AM-OLED continuously maintains a light emitting state during a frame time at a low current. Therefore, the AM-OLED has a resolution higher than that of the PM-OLED and is advantageous for driving a large area display panel and consumes low power. Further, a thin film transistor (TFT) is embedded in the AM-OLED, and thus, each component may be individually controlled, so that it is easy to implement a delicate screen.

Further, the organic material layer 280 may include a hole injection layer (HIL), a hole transport layer (HTL), an electron injection layer (EIL), an electron transport layer (ETL), and an emission material layer (EML).

Briefly describing each of the layers, HIL injects holes and is made of a material such as CuPc, etc. HTL functions to move the injected holes and mainly is made of a material having a good hole mobility. Arylamine, TPD, and the like may be used as the HTL. The EIL and ETL inject and transport electrons and the injected electrons and electron holes are combined in the EML to emit light. The EML as a material represents the color of the emitted light is composed of a host determining the lifespan of the organic matter and a dopant determining the color sense and efficiency. This just describes the basic structure of the organic material layer 280 include in the OLED panel and the present invention is not limited to the layer structure or material, etc., of the organic material layer 280.

The organic material layer 280 is inserted between an anode (not illustrated) and a cathode (not illustrated) and when the TFT becomes an on-state, a driving current is applied to the anode and the holes are injected, and the electrons are injected to the cathode and the electron holes and electrons move to the organic material layer 280 to emit the light.

It is apparent to those skilled in the art that the LCD panel or the OLED panel may further include other configurations for the purpose of performing the displaying function and may be transformed.

The display module 200 of the touch input device 1000 according to the present invention may include the display panel 200A and a component for driving the display panel 200A. Specifically, when the display panel 200A is the LCD panel, the display module 200 may be configured to include a backlight unit (not illustrated) arranged below the second polarization layer 272 and may further include a display panel control IC for operating the LCD panel, a graphic control IC, and other circuits.

In the touch input apparatus 1000 according to an embodiment of the present invention, the touch sensor panel 10 for detecting the touch position may be located outside or inside the display module 200.

In the touch input apparatus 1000, when the touch sensor panel 10 is arranged outside the display module 200, the touch sensor panel may be arranged above the display module 200 and the touch sensor panel 10 may be included in the touch sensor panel. The touch surface of the touch input apparatus 1000 may be the surface of the touch sensor panel.

In the touch input apparatus 1000, when the touch sensor panel 10 is arranged inside the display module 200, the touch sensor panel 10 may be configured to be located outside the display panel 200A. Specifically, the touch sensor panel 10 may be formed on the top of the first substrate layer 261 or 281. In this case, the touch surface of the touch input apparatus 1000 is the outer surface of the display module 200 and may become an upper surface or a lower surface in FIGS. 3A and 3B.

In the touch input apparatus 1000, when the touch sensor panel 10 is arranged inside the display module 200, at least a part of the touch sensor panel 10 may be configured to be located in the display panel 200A and at least the remaining part of the touch sensor panel 10 may be configured to be located outside the display panel 200A according to an embodiment. For example, any one of the driving electrode TX and the receiving electrode RX which constitute the touch sensor panel 10 may be configured to be located outside the display panel 200A and the other electrode may be configured to be located inside the display panel 200A. Specifically, any one of the driving electrode TX and the receiving electrode RX which constitute the touch sensor panel 10 may be formed on the top of the first substrate layer 261 or 281 and the other electrode may be formed on the bottom of the first substrate layer 261 or 281 and the top of the second substrate layer 262 or 283.

In the touch input apparatus 1000, when the touch sensor panel 10 is arranged inside the display module 200, the touch sensor panel 10 may be configured to be located inside the display panel 200A. Specifically, the touch sensor panel 10 may be formed on the bottom of the first substrate layer 261 or 281 or the top of the second substrate layer 262 or 283.

When the touch sensor panel 10 is arranged inside the display panel 200A, an electrode for the operation of the touch sensor may be additionally arranged, but various components and/or electrodes located inside the display panel 200A may also be used as the touch sensor panel 10 for touch sensing. Specifically, when the display panel 200A is the LCD panel, at least any one of the electrodes included in the touch sensor panel 10 may include at least any one of the data line, the gate line, the TFT, the common electrode Vcom, the pixel electrode and when the display panel 200A is the OLED panel, at least any one of the electrodes included in the touch sensor panel 10 may include at least any one of the data line, the gate line, the first power line ELVDD, and the second power line ELVSS.

In this case, the touch sensor panel 10 operates as the driving electrode and the receiving electrode described in FIG. 1A to detect the touch position according to mutual capacitance between the driving electrode and the receiving electrode. Further, the touch sensor panel 10 serves as the single electrode 30 described in FIG. 1B to detect the touch position according to the self-capacitance of each single electrode 30. In this case, when the electrode included in the touch sensor panel 10 is an electrode used for driving the display panel 200A, the display panel 200A may be driven at a first time interval and the touch position may be detected at a second time interval different from the first time interval.

In general, as a distance between the driving electrode and/or the receiving electrode constituting the touch sensor panel 10 and the electrode included in the display module 200 decreases, parasitic capacitance increases. In addition, since capacitance coupling between the driving electrode and/or the receiving electrode constituting the touch sensor panel 10 and the electrode included in the display module 200 increases as parasitic capacitance increases, an influence of noise generated from the display module 200 increases in driving the touch sensor panel 10. Accordingly, in order to escape from the influence of the noise of the display module 200, the touch sensor panel 10 and the display module 200 are synchronized to operate the touch input device 1000 as illustrated in FIG. 5.

Figure 5:
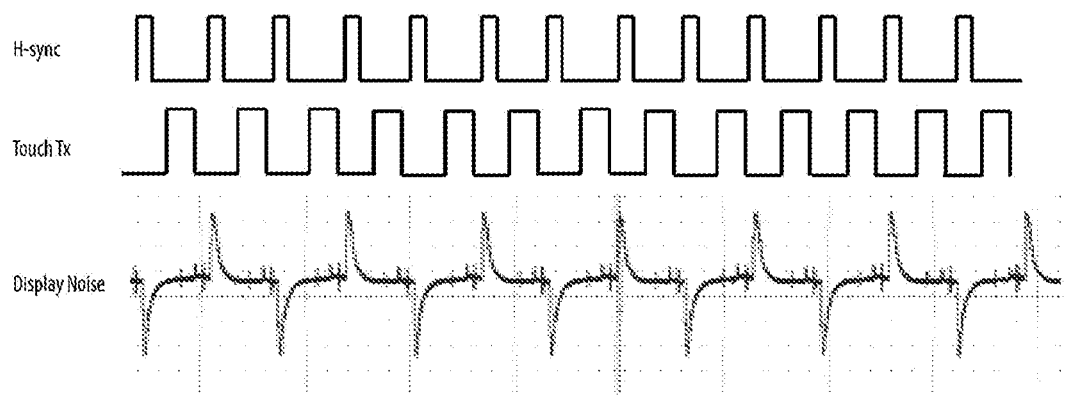
FIG. 5 is a diagram referred to describe that a touch sensor panel and a display module are synchronized and a touch input apparatus is driven according to an embodiment of the present invention.

Specifically, as illustrated in FIG. 5, display noise may be generated while being temporally synchronized with a horizontal synchronization signal (H-sync, Horizontal-sync) generated by the display module 200. In order to avoid such noise, for example, a touch driving signal may be input in an interval in which the horizontal synchronization signal is '0'. That is, after a first horizontal synchronization signal is input, the touch driving signal may be controlled to be input from a point passing through a downward edge portion of the first horizontal synchronization signal.

As such, in order for the touch driving signal to be synchronized with the horizontal synchronization signal, the touch driving signal has a frequency of n times or 1/n times the horizontal synchronization signal. For example, when the horizontal synchronization signal is 178 kHz, the touch driving signal has 178 kHz, 356 kHz, or 534 kHz or 89 kHz, 59.33 kHz, etc. Meanwhile, display noise including a fundamental frequency and harmonics of the horizontal synchronization signal is generated as an input of the horizontal synchronization signal. However, since the touch driving signal has the frequency of n times or 1/n times that of the horizontal synchronization signal, the touch driving signal is affected by the display noise, thereby reducing the performance of the touch input apparatus 1000. In other words, even when the touch driving signal is driven in synchronization with the horizontal synchronization signal in order to avoid the display noise, since the touch driving signal has the frequency of n times or 1/n times of the horizontal synchronization signal, the touch driving signal may not be completely free from the display noise. In addition, when noise having a frequency of n times or 1/n times of the horizontal synchronization signal is introduced from the outside, there is no method for avoiding the noise, and the performance of the touch input apparatus is reduced. Accordingly, in the present invention, a method for driving the touch sensor panel based on a newly implemented touch driving signal in order to improve the performance of the touch input apparatus 1000 will be described.

Figure 6A:
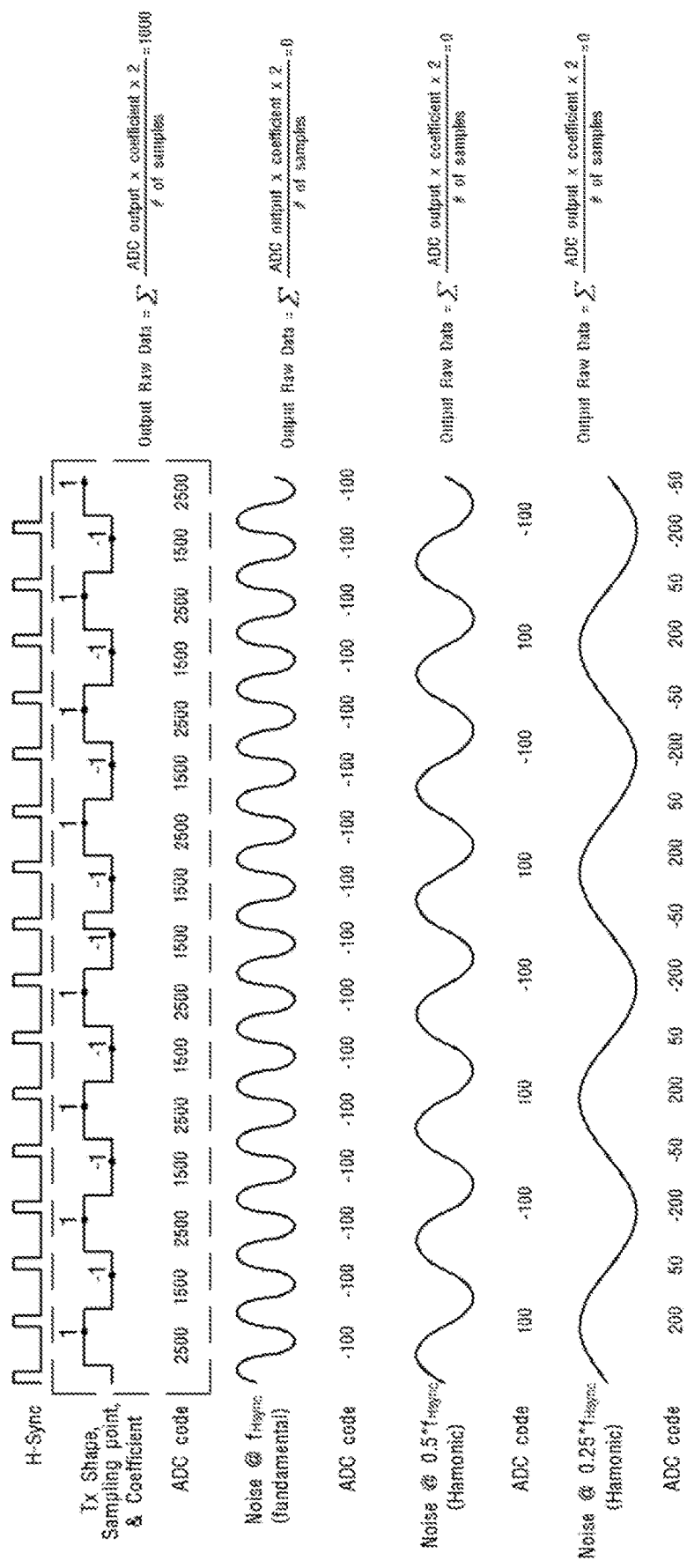
FIGS. 6A and 6B is a diagram referred to describe a touch sensor panel driving method according to the present invention.
Figure 6B:
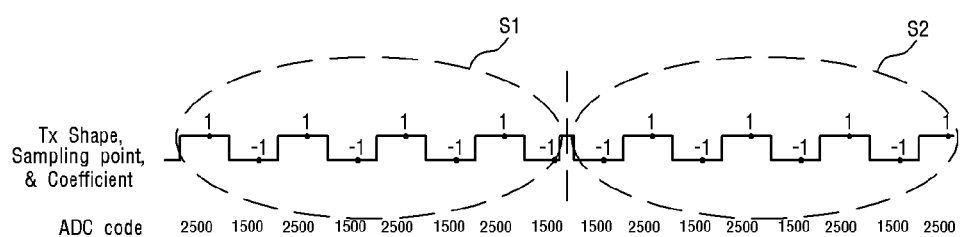

FIGS. 6A and 6B is a diagram referred to describe a touch sensor panel driving method according to the present invention.

As illustrated in FIGS. 6A and 6B, the touch driving signal according to the present invention may be applied by the control unit 13 to an interval other than the edge portion of the horizontal synchronization signal (hereinafter, referred to as a display synchronization signal). In particular, in the present invention, the touch driving signal may be applied after the downward edge of the display synchronization signal has elapsed. However, in some embodiments, the touch driving signal may be applied at a time point before an upward edge of the display synchronization signal elapses and the downward edge occurs.

When a part of the touch driving signal is applied to the touch sensor panel 100 in a form in which the phase is inverted, the influence from the noise generated by the display module 200 may be removed. Specifically, as illustrated in a dotted area of FIG. 6A and FIG. 6B, the touch driving signal may include a first touch driving signal S1 and a second touch driving signal S2 having a phase inverted by 180° from the first touch driving signal S1. However, according to another embodiment, the second touch driving signal S2 may be implemented to have a phase changed by a different angle (an angle less than 180° or an angle greater than 180° or less than 360°).

The control unit 13 may alternately apply the first touch driving signal and the second touch driving signal at a predetermined period. In addition, information on the predetermined period may be preset and stored in a memory (not illustrated). In the present invention, a period at which the first touch driving signal is applied and a period at which the second touch driving signal is applied may be implemented to be the same as each other. For example, as illustrated in FIGS. 6A and 6B, it may be implemented so that after the first touch driving signal is applied 4 times, the second touch driving signal is applied 4 times. However, according to another embodiment, the numbers of times when the first touch driving signal and the second touch driving signal may be implemented to be different from each other.

In addition, in the present invention, the first touch driving signal and the second touch driving signal having a changed phase thereof are illustrated, but may further include the first touch driving signal and a third touch driving signal having a changed phase, a fourth touch driving signal, etc. In this case, the periods at which the third touch driving signal and the fourth touch driving signal are applied may be implemented to be the same as each other or implemented to be different.

In this case, in FIGS. 6A and 6B, it is illustrated that the touch driving signal has a frequency of ½ times of the frequency of the display synchronization signal, but in addition, the touch driving signal may have a frequency of 1/n times or n times (a natural number of n≥2) the frequency of the display synchronization signal.

Meanwhile, as illustrated in FIGS. 6A and 6B, the scanning of an Analogue Digital Converter (ADC) output value may be performed once or more times in a period in which the touch driving signal is high and a period in which the touch driving signal is low, respectively. Specifically, the Analogue Digital Converter (ADC) output value may be obtained at least once in each of the periods in which the first touch driving signal and the second touch driving signal are high and low, respectively. Alternatively, according to another embodiment, the scanning of the Analogue Digital Converter (ADC) output value may be performed only once in a predetermined period including the period in which the first and second touch driving signals are high and the period in which the first and second touch driving signals are low.

In the following description, a time point at which the output value is acquired is referred to as a 'scanning point'. The display noise includes a fundamental frequency component and a harmonic component of the display synchronization signal frequency and as illustrated in FIGS. 6A and 6B, when the touch driving signal is scanned once in each of a period in which the touch driving signal is high and a period in which the touch driving signal is low and added as large as a predetermined interval, the basic frequency component and the harmonics component noise of the display synchronization signal frequency are cancelled and removed. The predetermined period may be a period of the first touch driving signal and the second touch driving signal or a period of a positive integer multiple.

Specifically, the Analogue Digital Converter (ADC) output value extracted from a scanning point is multiplied by a sampling coefficient of the touch driving signal corresponding thereto and all are summed up for a predetermined period to remove the noise. In addition, the sampling coefficient may be +1 in the period in which the first touch driving signal and/or the second touch driving signal is high and may be −1 in the period in which the first touch driving signal and/or the second touch driving signal is low. For reference, in the present invention, since the second touch driving signal has a phase that is 180° inverted from the first touch driving signal, the high (+1) period of the first touch driving signal may be changed to a low (−1) interval of the second touch driving signal and the low (−1) period of the first touch driving signal may be changed to the high (+1) period of the second touch driving signal.

For example, in the case of noise of the fundamental frequency component, when −100 is output as the Analogue Digital Converter (ADC) output value for every scanning point, but the ADC output value is substituted into Equation 1 below and when all are summed up during a period in which the first touch driving signal is applied and a period in which the second touch driving signal is applied, 0 is finally output.

$$\text{Output Raw Data} = \sum \frac{ADC \text{ Output} \times \text{Coefficient} \times 2}{\text{\# of samples}} \quad \text{[Equation 1]}$$

In the case of ½ harmonic noise, when +100 and −100 are alternately output as the Analogue Digital Converter (ADC) output value, but the ADC output value is substituted into Equation 1 above and when all are summed up during a period in which the first touch driving signal is applied and a period in which the second touch driving signal is applied, 0 is finally output.

It can be seen that in the case of ¼ harmonic noise, when +200, +50, −200, and −50 are alternately output as the Analogue Digital Converter (ADC) output value, but the ADC output value is substituted into Equation 1 above and all added during a period in which the first touch driving signal is applied and a period in which the second touch driving signal is applied, 0 is finally output.

As described above, the Analogue Digital Converter (ADC) output value is multiplied by the sampling coefficient of the touch driving signal corresponding thereto and then, all are summed up during a predetermined period to remove the noise and the predetermined period of the present invention may be N times (N is a natural number greater than or equal to 1) a period in which the first touch driving signal and the second touch driving signal are repeated once. For example, as illustrated in FIG. 6B, if a period in which the first touch driving signal is applied 4 times and the second touch driving signal is applied 4 times in the opposite phase is called a first period, all are added during a period in which the first period is repeated once or during a period in which the first period is repeated once or more to remove the noise.

Hereinafter, a component of a frequency corresponding to the touch driving signal of FIGS. 6A and 6B will be analyzed with reference to FIGS. 7A to 7C and Equation 2 below. In the following analysis, a square wave is replaced with a signal of the fundamental frequency component and analyzed.

Figure 7A:
FIGS. 7A to 7C is a diagram referred to describe a frequency hopping process according to the present invention.
Figure 7B:
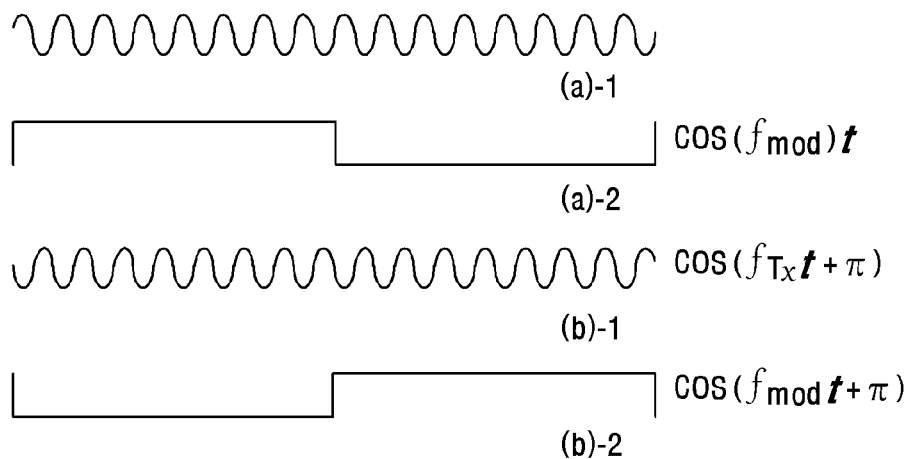
Figure 7C:
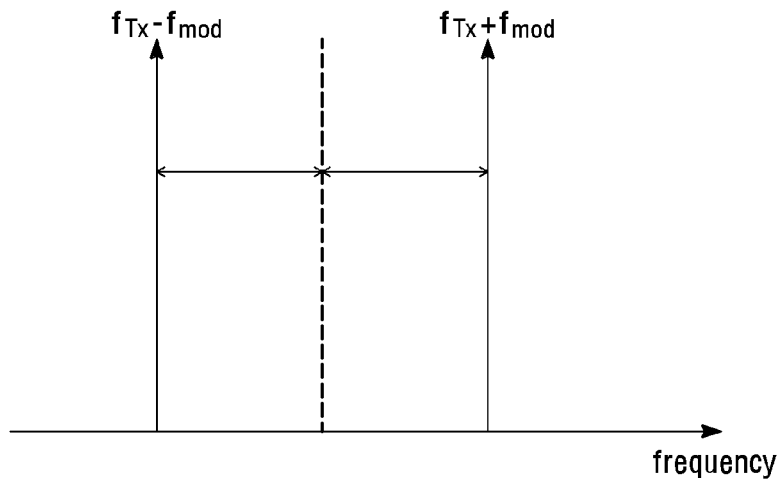

As illustrated in FIG. 7A, the touch driving signal may include a first touch driving signal and a second touch driving signal which is phase-inverted to the first touch driving signal by 180° and for the touch driving signal of FIG. 7A, (a)-1 and (a)-2 of FIG. 7B are multiplied and (b)-1 and (b)-2 of FIG. 7B are multiplied and multiplication results are added again to be finally acquired.

$$Tx \text{ signal} = \cos f_{Tx}t \cdot \cos f_{mod}t + \cos(f_{Tx}t+\pi)\cdot\cos(f_{mod}t+\pi) = 2\cos f_{Tx}t\cdot\cos f_{mod}t = \cos(f_{Tx}t+f_{mod})t+\cos(f_{Tx}t-f_{mod})t \quad \text{[Equation 2]}$$

As a result, as illustrated in FIG. 7B, it can be seen that the touch driving signal is driven with an effective frequency constituted by a driving frequency $f_{tx}$ and a phase inversion frequency $f_{mod}$ for changing the phase of the driving frequency. Specifically, an equation of effective frequency=driving frequency ($f_{tx}$)±phase inversion frequency ($f_{mod}$) is established. That is, it can be seen that if the signal with the driving frequency ($f_{tx}$) is phase-inverted by a phase inversion period ($1/f_{mod}$), in the frequency domain, a frequency component corresponding to $f_{tx}+f_{mod}$ and a frequency component corresponding to $f_{tx}-f_{mod}$ appear, and as a result, the effective frequency of the touch driving signal is different from the frequency of the display synchronization signal and the harmonics, so that the influence of the noise generated from the display synchronization signal is greatly reduced.

On the other hand, so far, a scheme of driving the touch sensor panel applying the touch driving signal by changing the phase in order to reduce the influence of the noise generated from the display synchronization signal is described and hereinafter, a scheme of driving the touch sensor panel for escaping from the noise through frequency hopping through dummy scan when the noise is generated in the effective frequency is described. Specifically, according to an embodiment of the present invention, while the touch driving signal is configured by a frequency signal synchronized with the display synchronization signal, it is possible to obtain the effect of the frequency hopping through fmod frequency change, and as a result, it is possible to overcome a fundamental limitation that the frequency hopping may not be performed in the conventional method for driving the touch sensor panel driven while being synchronized with the display synchronization signal.

Figure 8:
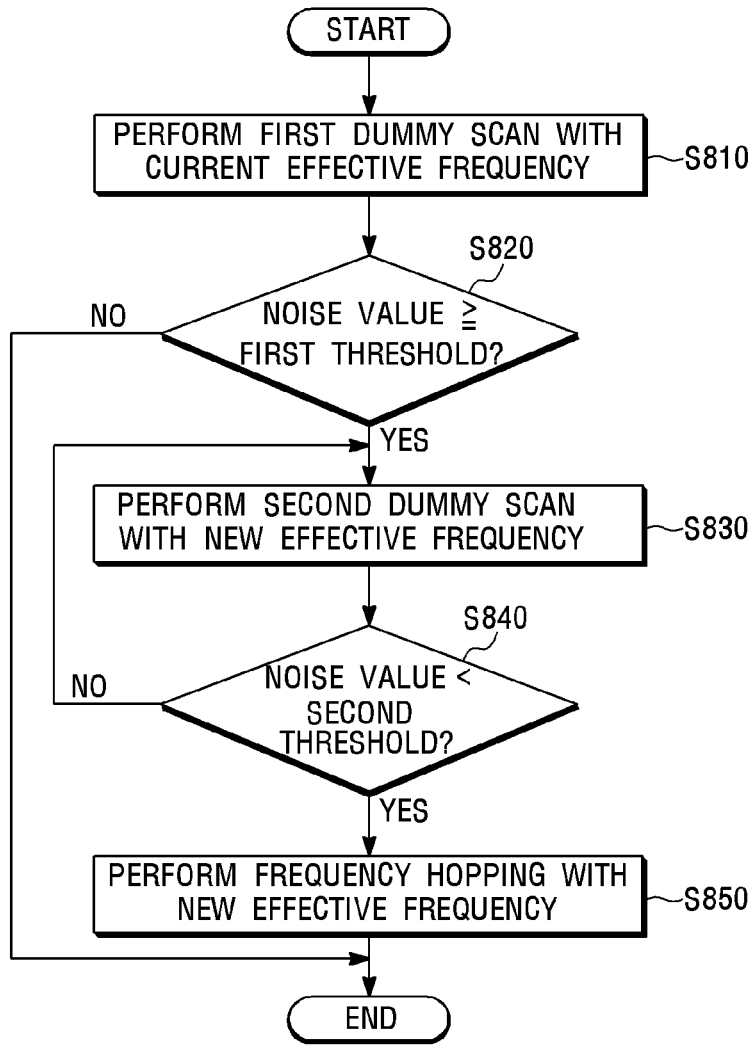
FIG. 8 is a flowchart of a frequency hopping process according to the present invention.

FIG. 8 is a flowchart referred to describe a frequency hopping process according to an embodiment of the present invention.

As illustrated in FIG. 8, while driving the touch sensor panel based on the current effective frequency, a first dummy scan for scanning a noise level at the current effective frequency may be performed (S810). Current effective frequency=current driving frequency±current phase inversion frequency. The first dummy scan may be performed by reading the noise level in a process of phase inversion of the current driving frequency in a cycle corresponding to the current phase inversion frequency according to an embodiment. Alternatively, according to another embodiment, the first dummy scan may be performed by reading the noise level based on a frequency corresponding to a current effective frequency value ($f_{tx}+f_{mod}$, $f_{tx}-f_{mod}$).

As a result of performing the first dummy scan, if the control unit 13 determines that a noise value at the effective frequency is equal to or greater than a first threshold (S820), a second dummy scan may be performed with a new effective frequency (S830). Information on the first threshold may be preset and stored in a memory (not illustrated). When the control unit 13 determines that the noise value is less than the first threshold, the noise level at the current effective frequency is within an allowable value, and as a result, performing a frequency hopping algorithm may be terminated.

The new effective frequency may be obtained by changing one of the driving frequency or the phase inversion frequency ($f_{mod}$). That is, by changing only the driving frequency, the second dummy scan may be performed by phase-inverting the new driving frequency for each current phase inversion frequency. Alternatively, by changing only the phase inversion frequency, the second dummy scan may be performed by phase-inverting the current driving frequency for each new phase inversion frequency. Alternatively, the second dummy scan may be performed by changing both the driving frequency and the phase inversion frequency. In addition, a driving frequency change value and a phase inversion frequency change value may be preset and stored in a memory (not illustrated).

Alternatively, the second dummy scan may be performed based on the frequency corresponding to the new effective frequency value. That is, the dummy scan for a final effective frequency to which the changed driving frequency or the changed phase inversion frequency is reflected may be performed by using a general scan scheme other than a phase inversion scan. For example, in an embodiment of changing the phase inversion frequency ($f_{mod}$) to $f'_{mod}$ to change the frequencies to new effective frequencies $f_{tx}+f'_{mod}$ and $f_{tx}-f'_{mod}$, the second dummy scan may be performed based on the frequency corresponding to a new effective frequency value ($f_{tx}+f'_{mod}$, $f_{tx}-f'_{mod}$). Alternatively, in an embodiment of changing the driving frequency ($f_{tx}$) to $f'_{tx}$ to change the frequencies to new effective frequencies $f'_{tx}$, to $f'_{tx}+f_{mod}$ and $f'_{tx}-f_{mod}$, the second dummy scan may be performed based on the frequency corresponding to the new effective frequency value ($f'_{tx}+f_{mod}$, $f'_{tx}-f_{mod}$).

When it is determined that the noise value is less than a second threshold as a result of performing the second dummy scan (S840), the noise level at the new effective frequency is within an allowable value, and as a result, the frequency hopping may be performed with the new effective frequency (S850). That is, when it is determined that the noise value is less than the second threshold, the new effective frequency is changed to the driving signal to drive the touch panel with the changed driving signal. Information on the second threshold may be preset and stored in a memory (not illustrated). When it is determined that the noise value is equal to or more than the second threshold, the noise level at the new effective frequency is also equal to or more than the allowable value, and as a result, S830 to S840 may be repeatedly performed by performing the dummy scan with another effective frequency again.

Hereinabove, features, structures, effects, and the like described in the embodiments are included in one embodiment of the present invention, and are not particularly limited to only one embodiment. Further, features, structures, effects, and the like exemplified in each embodiment may be carried out while being combined or modified for other embodiments by those skilled in the art to which the embodiments pertain. Therefore, the contents related to such combinations and modifications should be interpreted as being included in the scope of the present invention.

Further, although several embodiments of the present invention have been mainly described above, these are merely examples and do not limit the present invention, and those skilled in the art to which the present invention pertains will know that various modifications and applications not illustrated above can be made within the scope without departing from the essential characteristics of the embodiment. For example, each component specifically shown in the embodiment may be implemented by being modified. In addition, it will be interpreted that differences related to the modifications and applications are included in the scope of the present invention defined in the appended claims.

According to an embodiment of the present invention, when noise exists in a frequency band of a driving signal in touch sensing, the noise can be minimized in a frequency of the driving signal.

The invention claimed is:

1. A touch sensor panel driving method of applying a touch driving signal to a touch sensor panel according to a display synchronization signal, the touch sensor panel driving method comprising:
   synchronizing the touch driving signal applied to the touch sensor panel with the display synchronization signal and applying the touch driving signal,
   wherein the touch driving signal includes a first touch driving signal and a second touch driving signal having a 180°-inverted phase to the first touch driving signal,
   wherein an Analogue Digital Converter (ADC) output value is obtained at least once in the period in which the first touch driving signal and the second touch driving signal are high and the period in which the first touch driving signal and the second touch driving signal are low, respectively,
   wherein the noise is removed by adding a value acquired by multiplying the acquired output value by a sampling coefficient for a predetermined period.

2. The touch sensor panel driving method of claim 1, wherein the touch driving signal has a frequency of 1/n times or n times of the frequency of the display synchronization signal.

3. The touch sensor panel driving method of claim 2, wherein the first touch driving signal and the second touch driving signal are alternately applied at a predetermined period.

4. The touch sensor panel driving method of claim 1, wherein the sampling coefficient is +1 in a period in which the first touch driving signal and the second touch driving signal are high and −1 in a period in which the first touch driving signal and the second touch driving signal are low.

5. The touch sensor panel driving method of claim 4, wherein the predetermined period is N times (N is a natural number of 1 or more) of the period in which the first touch driving signal and the second touch driving signal are repeated once.

6. A touch sensor panel driving method of applying a touch driving signal to a touch sensor panel according to a display synchronization signal, the touch sensor panel driving method comprising:
- synchronizing the touch driving signal applied to the touch sensor panel with the display synchronization signal and applying the touch driving signal, wherein the touch driving signal is driven with an effective frequency constituted by a driving frequency (ftx) and a phase inversion frequency (fmod) for changing a phase of the driving frequency, and
- a dummy scan of scanning a noise level based on the effective frequency is performed to perform frequency hopping according to a result of the performed dummy scan, wherein the touch driving signal includes a first touch driving signal and a second touch driving signal having a 180°-inverted phase to the first touch driving signal.

7. The touch sensor panel driving method of claim 6, wherein the effective frequency satisfies a following equation for the driving frequency (ftx) and the phase inversion frequency (fmod),
- effective frequency=driving frequency (ftx)±phase inversion frequency (fmod), and the performing of the frequency hopping includes
- a first step of performing a first dummy scan with a current effective frequency,
- a second step of performing a second dummy scan with a new effective frequency when a noise value acquired by performing the first dummy scan is equal to or more than the first threshold, and
- a third step of performing the frequency hopping with the new effective frequency when a noise value acquired by performing the second dummy scan with the new effective frequency is equal to or less than a second threshold.

8. The touch sensor panel driving method of claim 7, wherein in the first step, the first dummy scan is performed by phase-inverting the driving frequency (ftx) for each phase inversion frequency (fmod).

9. The touch sensor panel driving method of claim 7, wherein in the first step, the first dummy scan is performed based on a frequency corresponding to the current effective frequency value.

10. The touch sensor panel driving method of claim 7, wherein in the second step, the second dummy scan is performed by phase-inverting a new driving frequency for each phase inversion frequency (fmod).

11. The touch sensor panel driving method of claim 7, wherein in the second step, the second dummy scan is performed by phase-inverting the driving frequency (ftx) for each new phase inversion frequency.

12. The touch sensor panel driving method of claim 7, wherein in the second step, the second dummy scan is performed based on a frequency corresponding to the new effective frequency value.

13. A touch input apparatus comprising:
- a touch sensor panel; and
- a control unit controlling, when a touch driving signal is applied to the touch sensor panel according to a display synchronization signal, to apply the touch driving signal in synchronization with the display synchronization signal,
- wherein the touch driving signal includes a first touch driving signal and a second touch driving signal having a 180°-inverted phase to the first touch driving signal,
- wherein an Analogue Digital Converter (ADC) output value is obtained at least once in the period in which the first touch driving signal and the second touch driving signal are high and the period in which the first touch driving signal and the second touch driving signal are low, respectively,
- wherein the noise is removed by adding a value acquired by multiplying the acquired output value by a sampling coefficient for a predetermined period.

* * * * *